United States Patent [19]

Olstowski

[11] 3,914,198

[45] Oct. 21, 1975

[54] RAPID-SETTING POLYURETHANES

[75] Inventor: Franciszek Olstowski, Freeport, Tex.

[73] Assignee: The Dow Chemical Company, Midland, Mich.

[22] Filed: May 24, 1974

[21] Appl. No.: 473,053

Related U.S. Application Data

[62] Division of Ser. No. 392,591, Aug. 29, 1973, Pat. No. 3,847,859.

[52] U.S. Cl. ............................................. 260/30.4 N
[51] Int. Cl.² ............................................. C08K 5/15
[58] Field of Search .............................. 260/30.4 N

[56] References Cited
UNITED STATES PATENTS

| | | | |
|---|---|---|---|
| 3,075,927 | 1/1963 | Lanham | 260/31.6 |
| 3,102,875 | 9/1963 | Heiss | 260/30.4 N |
| 3,378,511 | 4/1968 | Newton | 260/31.8 |
| 3,489,723 | 1/1970 | Kraft | 260/77.5 |
| 3,499,858 | 3/1970 | Strassel | 260/30.4 N |
| 3,725,355 | 4/1973 | Parrish | 260/77.5 AP |
| 3,726,827 | 4/1973 | Jones | 260/31.8 N |
| 3,746,692 | 7/1973 | Olstowski | 260/77.5 MA |

*Primary Examiner*—Paul R. Michl
*Attorney, Agent, or Firm*—James G. Carter

[57] ABSTRACT

The surface hardness and/or the flexural stiffness of rapid-setting polyurethane products are improved by employing as the sole modifier component or at least 50% by weight of the modifier component (1) a substituted aromatic hydroxyl containing compound having at least 1 substituent group containing at least 3 carbon atoms, (2) certain cyclic anhydrides of a dicarboxylic acid such as dodecenyl succinic anhydride, or (3) mixtures thereof.

14 Claims, No Drawings

RAPID-SETTING POLYURETHANES

This is a division of application Ser. No. 392,591, filed Aug. 29, 1973, now U.S. Pat. No. 3,842,859.

The present invention relates to rapid-setting polyurethane products having improved physical properties.

Rapid-setting polyurethanes are taught in U.S. Pat. Nos. 3,375,511, 3,726,827 and in copending applications Ser. No. 366,835, filed 6-4-73, titled "NON-ELASTOMERIC POLYURETHANE COMPOSITIONS" by Franciszek Olstowski et al. now U.S. Pat. No. 3,878,157; Ser. No. 191,343, filed 10-21-71, titled "RIGID POLYURETHANE COMPOSITIONS" by Franciszek Olsowski et al. now U.S. Pat. No. 3,746,692; Ser. No. 327,718, filed 1-29-73, titled "SOLID, RAPIDSETTING, RIGID POLYURETHANE" by Franciszek Olstowski now abandoned; and Ser. No. 327,630, filed 1-29-73, titled "SOLID, RAPIDSETTING, RIGID POLYURETHANES" by Franciszek Olstowski now abandoned.

It has been unexpectedly discovered that rapidsetting polyurethanes possessing an improvement in one or more physical properties including surface hardness and/or flexural stiffness by emplying as the sole modifier or as a portion of a mixture of modifiers (1) a substituted hydroxyl-containing aromatic compound having at least one substituent which contains at least 3 carbon atoms, (2) a cyclic anhydride of a dicarboxylic acid said anyhydride having a molecular weight of at least 112, or (3) mixtures of (1) and (2).

The present invention is therefore directed to solid, rigid, non-cellular urethane products having a density of at least about 1 gram/cc resulting from admixture of the components of a composition comprising A. an active hydrogen-containing component selected from
  1. a polyether polyol having a hydroxyl equivalent weight of between about 75 and about 230 and containing from 3 to about 8 hydroxyl groups per molecule,
  2. a dihydroxyl-containing compound having a hydroxyl equivalent weight of less than about 250, and
  3. mixtures thereof;
B. an organic polyisocyanate;
C. modifier component comprising
  1. 50–100% by weight of a modifier selected from
    a. a substituted hydroxyl-containing aromatic material having at least one substituent which contains at least 3 carbon atoms,
    b. a cyclic anhydride of a dicarboxylic acid said anhydride selected from the group consisting of docecenyl succinic anhydride, tetrahydrophthalic anhydride and methylbicyclo (2.2.1) heptene 2,3-dicarboxylic anhydride,
    c. mixtures thereof, and
  2. 0–50% by weight of a co-modifier selected from
    a. organic liquid materials having a boiling point above about 150°C at atmospheric pressure,
    b. liquid halogenated aliphatic materials containing a hydroxyl group and having a boiling point of less than about 150°C. at atomspheric pressure, or
    c. mixtures thereof;
D. a non-amine catalyst for urethane formation;
wherein components (A) and (B) are present in quantities such that the NCO:OH ratio is from about 0.8:1 to about 1.5:1 and preferably from about 0.9:1 to about 1.2:1; the quantities of Component C being from about 10 to about 50 and preferably from about 20 to about 40 percent by weight based upon the combined weight of components (A), (B) and (C); with the provision that when Component A-2 is employed as the sole component of A then component B has a functionality of at least about 2.5, and when component A-1 is an amine initiated polyol and is employed as the sole component of component A, then component D need not be present; and wherein said product can be demolded within less than about 5 minutes, without the application of an external source of heat, after admixture of the components of said composition.

The term "rapid-setting" as used herein means that the composition will rapidly solidify without the application of external sources of heat and can be removed from a mold within 5 minutes and preferably within 3 minutes from the time the components of the composition are admixed. Upon removal from the mold, the products have sufficient strength to be handled and normally have sufficient strength to be employed for their intended purposes; however, the physical properties, if desired, usually can be improved by post curing at elevated temperatures.

The term "dense" as employed herein means that the polyurethane product has a density of at least about 1.0 grams/cc.

The term "rigid" as employed herein means that the product has an elongation value of less than about 100%.

Suitable initiator compounds having from 3 to 8 hydroxyl groups which can be employed to prepare the polyols (component A-1) employed in the present invention include, for example, glycerine, trimethylolpropane, pentaerythritol, sorbitol, sucrose, ammonia, ethylenediamine, 1,3-diaminopropane, 1,4-diaminobutane, 1,5-diaminopropane, 1,6-diaminohexane, diethylenetriamine, triethylenediamine, tetraethylenepentamine, pentaethylenehexamine, mixtures thereof and the like.

Suitable vicinal epoxy compounds which may be reacted with the initiator compounds to prepare the polyols employed as component (A-1) in the present invention include, for example, the lower alkylene oxides and substituted alkylene oxides such as ethylene oxide, 1,2-propylene oxide, 1,2-butylene oxide, 2,3-butylene oxide, epichlorohydrin, epibromohydrin, epiodohydrin, styrene oxide, mixtures thereof and the like.

Suitable dihydroxyl-containing compounds having an OH equivalent weight below about 250 which are employed as component (A-2) include, for example, ethylene glycol, propylene glycol, butylene glycol, pentanediol, hexanediol, diethylene glycol, dipropylene glycol, bisphenol A, resorcinol, catechol, hydroquinone, mixtures thereof, adducts of a dihydroxyl-containing compound and a vicinal epoxy compound such as, for example, ethylene oxide, 1,2-propylene oxide, 1,2-butylene oxide, epichlorohydrin, epibromohydrin, mixtures thereof and the like. When the dihydroxyl containing compound is a solid it is suitably employed by dissolving it in a suitable solvent selected from those compounds which are suitably employed as a component (C-2) such as, for example, tri-n-butyl phosphate, triethyl phosphate and the like.

Suitable polyisocyanates which may be employed as component B in the compositions of the present invention include, for example, any organic polyisocyanate having 2 or more NCO groups per molecule and no other substituents capable of reacting with the hydroxyl groups of the polyoxyalkylene material. Suitable such polyisocyanates include, for example, 2,4-toluene-diisocyanate, 2,6-toluenediisocyanate, hexamethylene diisocyanate, p,p'-diphenylmethanediisocyanate, p-phenylenediisocyanate, hydrogenated methylene diphenyldiisocyanate (e.g. Hylene W) naphthalene diisocyanate, dianisidine diisocyanate, polymethylene polyphenyl-isocyanate, mixtures of one or more polyisocyanates and the like. The polyisocyanates can be employed in either the distilled or crude form.

Other organic isocyanates which may suitably be employed and which are to be inclined in the term organic polyisocyanate include isocyanate terminated prepolymers prepared from the previously mentioned polyols and the above mentioned isocyanates.

Suitable polyisocyanates which are employed as component (B) in the polyurethane compositions of the present invention also includes those having an average NCO functionality of at least about 2.5 such as, for example, the polymethylene polyphenyl isocyanates, NCO-containing prepolymers such as the reaction products of an excess of an organic diisocyanate with polyhydroxyl containing compounds having from 3 to about 8 OH groups per molecule such as, for example, glycerine, trimethylolpropane, pentaerythritol, sorbitol, sucrose, mixtures thereof with dihydroxyl-containing materials such that the average hydroxyl functionality of the mixture is at least about 2.5. It is preferred that the organic polyisocyanate be liquid; however in the event that it is a solid or semisolid or of a relatively high viscosity such that blending with the other components would be difficult or inconvenient, they may be prepared in a suitable solvent selected from those compositions which are employed as component (C) herein and any quantity of such component (C) employed as a solvent for the polyisocyanate is included as a portion of the total quantity of component (C) employed in the polyurethane composition. Suitable such solvents include, for example, trichlorobenzene, propylene carbonate and the like.

Suitable organic diisocyanate which are employed in the preparation of the prepolymers containing an average of at least 2.5 NCO groups include for example, 2,4-toluene-diisocyanate, 2,6-toluenediisocyanate, hexamethylene diisocyanate, p,p'-diphenylmethanediisocyanate, p-phenylenediisocyanate, hydrogenated methylene diphenyldiisocyanate (e.g. Hylene W) naphthalene diisocyanate, dianisidine diisocyanate, mixtures of one or more polyisocyanates and the like.

The prepolymers which can be employed as the polyisocyanate, component (B), in the present invention have a % free NCO content of from about 8 to about 40 preferably from about 12 to about 32 percent by weight.

The modifier compounds employed herein as component (C) moderate the reaction exotherm of the reaction between components (A) and (B) without substantial reaction therewith.

Suitable compounds which can be employed herein as component (C-1a) include, for example, tris(α-methyl benzyl) phenol; 2,4-dimethyl-6-tertiary butyl phenol; 2,4-dimethyl-6-octyl phenol; o-tertiary butyl phenol; tertiary butyl cresol; cumyl phenol; 2,6-ditertiary butyl-4-methyl phenol; ortho phenyl phenol; 2,2-thiobis(4-methyl-6-tertiary butyl phenol); 2,4,6-tritertiary butyl phenol; 2-chloro-6-phenyl phenol; α-naphthol; phenyl salicylate; mixtures thereof and the like.

Suitable compounds which are employed as the c modifier compound, component (C-2a), in the present invention include those liquid compounds having a boiling point above about 150°C at atmospheric pressure and which moderate the reaction exotherm between components (A), (B) and (D) without substantial reaction therewith. They are selected from the group consisting of fatty oils, fatty acids, organic phosphates, organic phosphites, organic phosphonates, cyclic ethers, aromatic compounds, partially hydrogenated aromatic compounds, halogenated aliphatic compounds, cyclic sulfones, organic carbonates, liquid esters of carboxylic acids, hydroxyl-containing and non-hydroxyl-containing polyoxyalkylene compounds, ester-modified polyoxyalkylene compounds and mixtures thereof.

Suitable aromatic compounds which are employed as the liquid co-modifier compound having a boiling point above about 150°C (Component C-2a) in the present invention include, for example, straight and branch chain aliphatic, alkoxy and halogen substituted benzenes, aromatic substituted benzene and aromatic ethers, such as, for example, propenyl benzene, propylbenzene, butylbenzene, ethyltoluene, butyltoluene, propyltoluene, diphenyl oxide, biphenyl, o-, m- and p-diethylbenzene, dodecylbenzene, octadecylbenzene, bromobenzene, 1-bromo-3-chlorobenzene, 1-bromo-4-fluorobenzene, 1-bromo-2-iodobenzene, 1-bromo-3-iodobenzene, 1-chloro-4-fluorobenzene, o-dibromobenzene, m-dibromobenzene, o-dichlorobenzene, m-dichlorobenzene, 1,3-dipropoxybenzene, 1-ethyl-4-propylbenzene, 1-fluoro-4-iodobenzene, 4-bromo-o-xylene, α-bromo-m-xylene, 4-bromo-m-xylene, α-chloro-m-xylene, 4-ethyl-m-xylene, 5-ethyl-m-xylene, 2-bromo-p-xylene, α-chloro-p-xylene, 2-ethyl-p-xylene, 2-ethyl-p-xylene, o-bromotoluene, m-bromotoluene, o-, m-, and p-chlorotoluene, tertiary butylstyrene, α-bromostyrene, β-bromostyrene, α-chlorostyrene, β-chlorostyrene, mixtures thereof and the like.

The above compounds are represented by the following general formula provided it is understood that such compounds represented by the formula are liquids and having boiling points at atmospheric pressure above about 150°C.

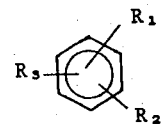

wherein $R_1$, $R_2$, and $R_3$ are independently selected from an alkyl group having from about 1 to about 18 carbon atoms, an alkenyl group having from 2 to about 3 carbon atoms, a halogen, an alkoxy group, an aromatic group and hydrogen.

Other suitable aromatic compounds which can be employed as the liquid co-modifier (component 2a) in the present invention include liquid multi-ring compounds having a boiling point above about 150°C such as, for example, 1-chloro-naphthalene, 1-bromo-naphthalene, mixtures thereof and the like.

Suitable partially hydrogenated multi-ring aromatic compounds which can be employed as the liquid co-modifier compound (component C-2a) in the present invention include, for example, 1,4-dihydronaphthalene, 1,2,3,4-tetrahydronaphthalene, mixtures thereof and the like.

Suitable fatty acids and naturally occuring fatty oils which can be employed as the liquid co-modifier (component C-2a) in the present invention includes, for example, oleic acid, linoleic acid, linolenic acid, and the fatty acids resulting from the hydrolysis of naturally occurring oils of animal and vegetable origin including for example, linseed oil, castor oil, tung oil, fish oil, soya oil and the like such acids as are produced as by-products in chemical processes including for example, tall oil, the byproduct resulting from the conversion of wood pulp to paper by the sulfate process, mixtures of any of the above and the like.

Also operable as the liquid co-modifier (component C-2a) are the naturally occurring fatty oils having boiling points above about 150°C including, for example, linseed oil, castor oil, tung oil, fish oil, soya oil, and the like.

Suitable organophosphorus compounds which can be employed as the liquid co-modifier, component (C-2a), include, for example, organo phosphates, organo phosphites and organo phosphonates having boiling points above about 150°C.

Organo phosphates, phosphites and phosphonates which can be employed as the liquid co-modifier (component C-2a) include those liquid compounds represented by the formulae

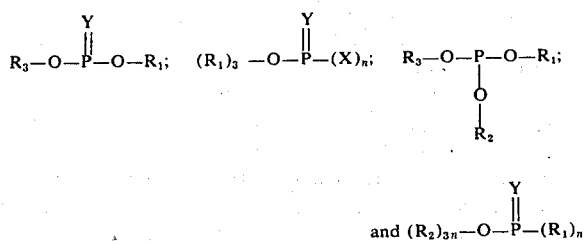

wherein $R_1$, $R_2$, and $R_3$ are independently selected from the group consisting of alkyl, alkoxyaryl, aryloxyaryl, alkaryl, aralkyl groups and halogen substituted derivatives thereof. Y is oxygen or sulfur, X is a halogen, i.e., chlorine, fluorine, bromine or iodine, n has a value of 1 or 2. Suitable compounds include, for example, tri-n-butyl phosphate, triethylphosphate, tricresylphosphate, tris-(beta-chloroethyl) phosphate, tris(2,3-dibromopropyl) phosphate, butyl dichlorophosphate, 2-chloroethyl dichlorophosphate, ethyl dichlorophosphate, diethyl fluorophosphate, bis(2-chloroethyl) fluorophosphate, dibutyl chlorophosphate, isoamyl dichlorothinonophosphate, ethyl dibromothiophosphate, 2-chlorophenyl dichlorophosphate, 2-methoxyphenyl dichlorophosphate, 2-phenoxyphenyl dichlorophosphate, 2-chloroethyl dichlorophosphite, tris(2-chloroethyl)phosphite, tributyl phosphite, tricresyl phosphite, triethyl phosphite, diethyl isoamylphosphonate, diethyl ethylphosphonate, dimethyl methylphosphonate, diethyl methylphosphonate, diisobutyl isobutylphosphonate, bis(2-bromopropyl)-2-bromopropane phosphonate.

When halo- or dihalo-phosphates or phosphites or their thiono derivatives are employed as the liquid co-modifier, component C-2a, they are preferably added to the composition just prior to the organo-metal catalyst so as to minimize their reaction with the hydroxyl groups of component (A).

The organo phosphorus compounds may be prepared by procedures described in ORGANO-PHOSPHORUS COMPOUNDS, G.M. Kosolapoff, John Wiley and Sons, Inc., 1950.

Suitable liquid organic carbonates which can be employed as the liquid co-modifier, component (C-2a), in the present invention include the acyclic and cyclic carbonates represented by the formulae

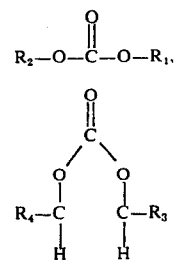

wherein each $R_1$ and $R_2$ are independently aryl, alkyl (having from about 1 to about 6 carbon atoms) or alkenyl groups (having from about 1 to about 6 carbon atoms) and substituted derivatives thereof and each $R_3$ and $R_4$ are selected from the same groups as $R_1$ and $R_2$ and hydrogen.

Suitable liquid acyclic organic carbonates which can be employed in the present invention include, for example, bis(2-chloroethyl carbonate), di-n-butyl carbonate, butyldiglycol carbonate, cresyldiglycol carbonate, dibutyl carbonate, di-2-ethylhexyl carbonate, dimethallyl carbonate, dinonyl carbonate and the like. The organic acyclic carbonate may be prepared by procedures given in U.S. Pat. No. 2,687,425.

Suitable liquid cyclic organic carbonates include, for example, propylene carbonate, butylene carbonate, styrene carbonate, mixtures thereof and the like. The cyclic organic carbonates may be prepared in the manner described in Canadian Pat. No. 556,006.

Suitable cyclic polyethers which can be employed as the liquid co-modifier (component C-2a) include, for example, the cyclic tetramer of ethylene oxide, cyclic pentamer of propylene oxide, cyclic tetramer of propylene oxide, mixtures of the above and mixtures of cyclic pentamers and above of ethylene oxide and or propylene oxide. Any liquid cyclic polyether having a boiling point above 150°C may be employed as the liquid modifier in the present invention including cyclic polyethers prepared from butylene oxide, epichlorohydrin and the like.

The liquid cyclic polyether modifier compounds are prepared by procedures mentioned in "CYCLIC POLYETHERS AND THEIR COMPLEXES WITH METAL SALTS" by C. J. Pedersen, *J. Am. Chem. Soc.*, Vol 89, p. 7071–7036, 1968, "TWELVE-MEMBERED POLYETHER RINGS. THE CYCLIC TETRAMERS OF SOME OLEFIN OXIDES" by R. S.

Kern; *J. Org. Chem.*, Vol. 33, p. 388–390, 1968; British Pat. Nos. 785,229 and 1,108,921.

Suitable halogenated aliphatic compounds having a boiling point above about 150°C which can be employed as the co-modifier (component C-2a) include, for example, tetrabromoethane, bromoform, hexachlorobutadiene, tetrachlorobutadiene, 1,2,3,3-tetrachlorobutane, 1,5-dibrompentane, 1,1,2-tribromopropane, 1,2,3-trichloropropene, polyepichlorohydrin diol having an equivalent weight above about 700 up to about 4000, chlorinated paraffins, e.g. "Chlorowax" No. 40, 1-mercapto-3-chloropropanol-2, 3-chloropropane-1,2-diol, 2-chloropropane-1,3-diol, 1,3-dichloro-2-propanol, mixtures thereof and the like.

Suitable polyoxyalkylene materials which can be employed as the liquid modifier (component C-2a) include, for example, 1. a liquid, totally-capped or non-hydroxylcontaining block or randomly formed polyoxyalkylene glycol represented by the general formula

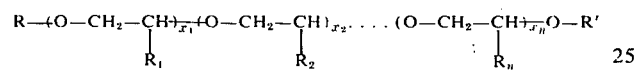

I.

wherein R and R' are independently selected from saturated and unsaturated hydrocarbon groups having from about 1 to about 6, preferably from about 1 to about 3, carbon atoms; $R_1, R_2, \ldots$ and $R_n$ are independently hydrogen, and aryl group, an alkyl group or haloalkyl group, said alkyl group or haloalkyl group having from about 1 to about 2 carbon atoms with the proviso that when $R_1, R_2, \ldots R_n$ is a haloalkyl group, it is present in minor amounts i.e. a ratio of from about 0 to about .10 percent of the total $R_1, R_2, \ldots R_n$ groups, and $x_1, x_2, \ldots x_n$ are integers, such that the boiling point of the liquid capped polyalkylene glycol is above about 150°C;

2. a liquid partially capped, block or randomly formed polyoxyalkylene compound represented by the general formula

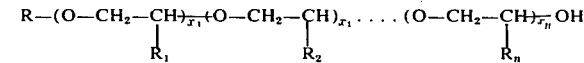

II.

wherein R and $R_1, R_2, \ldots R_n$ are as defined in Formula I above and $x_1, x_2, \ldots x_n$ are integers, the sum of which provides the partially capped polyoxyalkylene compound with a molecular weight of at least about 700;

3. a liquid, block or randomly formed polyoxyalkylene glycol represented by the general formula

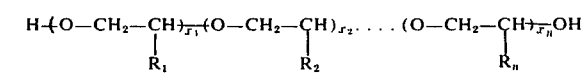

III.

wherein $R_1, R_2, \ldots R_n$ are as defined in Formula I above and $x_1, x_2, \ldots x_n$ are integers, the sum of which provides the polyoxyalkylene glycol with an equivalent weight of at least about 700, and 4. a liquid, random, or block polyoxyalkylene polyol having a hydroxyl functionality of from 3 to about 8 represented by the general formula

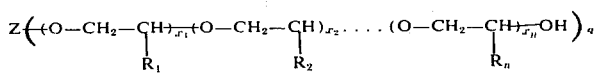

IV.

wherein $R_1, R_2, \ldots R_n$ are as defined in Formula I above, Z is the residue of an initiator compound having from 3 to about 8 hydroxyl groups, $x_1, x_2, \ldots x_n$ are integers, the sum of which provides the polyoxyalkylene polyol with a hydroxyl equivalent weight of at least about 500 and q is an integer having a value of from 3 to about 8.

Suitable ester-modified polyoxyalkylene materials which can be employed as the liquid modifier (component C-2a) include, for example, those liquid ester-modified polyethers having a boiling point above about 150°C represented by the general formula

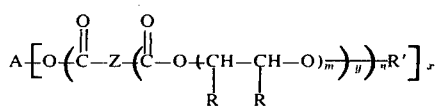

V.

wherein A is the residue of an initiator or starting compound having from 1 to about 8 hydroxyl groups, Z is the residue, excluding the carboxyl groups, of an internal anhydride of a saturated or unsaturated acyclic aliphatic, a saturated or unsaturated cyclic aliphatic, or aromatic polycarboxylic acid, halogenated derivatives thereof and mixtures thereof, each R is a substituent independently selected from hydrogen atoms, an alkyl radical having from 1 to 20 carbon atoms, a halomethyl radical, a phenyl radical, and a phenoxymethyl radical, an alkoxymethyl radical with the proviso that one of the R substituents must be hydrogen, R' is hydrogen or a saturated or unsaturated aliphatic group having from 1 to 20 carbon atoms, m has an average value of from about 1.0 to about 2.0, n has a value from about 1 to about 5, x has a value from about 1 to about 8 and y has a value of 1 or 2 and wherein said ester-modified polyether compound has a hydroxyl equivalent weight above about 500 when 3 or more hydroxyl groups are present and when 2 hydroxyl groups are present, an average equivalent weight of above about 700 and when zero or one hydroxyl group is present a molecular weight of above about 700.

Suitable initiators which can be employed to prepare the liquid polyoxyalkylene and ester-modified polyoxyalkylene modifier materials (component C-2a) of the present invention include compounds having from 1 to about 8 hydroxyl groups such as, for example, methanol, ethanol, propanol, butanol, ethylene glycol, propylene glycol, butylene glycol, 1,6-hexane diol, glycerine, trimethylolpropane, pentaerythritol, sorbitol, sucrose, mixtures thereof and the like.

When the liquid modifier, component (C-2a), is an ester modified polyether polyol, the initiator compound may also be and is preferably an adduct of the above mentioned initiators and one or more of the following vicinal epoxide-containing compounds, i.e. the initiator is a polyoxyalkylene material having 1 to 8 hydroxyl groups, preferably 2 to about 3 or 4 hydroxyl groups.

Suitable vicinal epoxides which may be reacted with the above mentioned initiator compounds to prepare the modifier (component C-2a) employed in the present invention include, for example, ethylene oxide, 1,2-propylene oxide, 1,2-butylene oxide, 2,3-butylene oxide, epichlorohydrin, epibromohydrin, epiiodohydrin, styrene oxide, mixtures thereof and the like.

The liquid modifiers represented by formulae I–IV and methods for their preparation are well known in the art, e.g. U.S. Pat. Nos. 2,448,664; 2,425,755; 2,782,240 and 2,520,611. Methods for the preparation of the liquid modifier compounds represented by the formula V are given in U.S. Pat. No. 3,502,601.

Suitable cyclic sulfones which can be employed as the liquid co-modifier (component C-2a) include the 5-membered cyclic sulfones such as, for example, 3-methylsulfolane (3-methyltetrahydrothiophene-1,1-dioxide) and the like.

Suitable esters of a carboxylic acid which may be employed as component (C-2a) include those esters prepared from mono- and polycarboxylic acids having from about 1 to about 20 carbon atoms such as, for example, phthalic, adipic, acetoacetic, formic, acetic, and abietic acids, mixtures thereof, and the like; and wherein the ester portion contains from about 1 to about 20 carbon atoms such as methyl, ethyl, propyl, butyl, hexyl, cyclohexyl, octyl, decyl, dodecyl, eicosyl and the like so long as the carboxylic acid ester has a boiling point above about 150°C and is a liquid at room temperature.

These acid esters may be prepared by condensing an acid having from about 1 to about 20 carbon atoms with a saturated or unsaturated aliphatic alcohol having from about 1 to about 20 carbon atoms, with the proviso that the ester product is a liquid and has a b.p. greater than 150°C.

The term "liquid modifier boiling above about 150°C" includes eutectic mixtures of the previously described classes of compounds which are solids at atmospheric pressure but said eutectic mixtures are a liquid at room temperature and atmospheric pressure which have boiling points above about 150°C. Also included in the definition are those solid compounds of the classes previously described which are dissolved in a liquid member of any of the described classes of compounds having boiling points above about 150°C wherein the resultant solution is a liquid at standard conditions of temperature and pressure and have boiling points at atmospheric pressure above about 150°C.

Suitable materials which can be employed as a co-modifier (component C-2b) includes, for example, mono-hydroxylcontaining compounds having from 2 to about 4 carbon atoms such as, for example, 2-chloroethanol, 2,2-dichloroethanol, 1-chloro-2-propanol, 1-bromo-2-propanol, 1-chloro-2-methyl2-propnaol, 1,1-dichloro-2-propanol, trifluoroethanol, monofluoroethanol, mixtures thereof and the like.

Suitable organo-metal catalysts for urethane formation which are employed in the present invention include, for example, organo-metal compounds of tin, zinc, lead, mercury, cadium, bismuth, cobalt, manganese, antimony, iron and the like such as, for example, metal salts of a carboxylic acid having from about 2 to 20 carbon atoms including, for example, stannous octoate, dibutyltin dilaurate, dibutyltin diacetate, ferric acetylacetonate, lead octoate, lead oleate, phenylmercuric propionate, cobalt naphthenate, lead naphthenate, mixtures thereof and the like.

It is preferred that the catalysts be employed in liquid form. Those catalysts which are not ordinarily liquids may be added as a solution in a solvent which is compatible with the other components employed in the composition of the present invention. Suitable such solvents include, for example, dioctylphthalate, polyoxyalkylene glycols, mineral spirits, dipropylene glycol, mixtures thereof and the like.

Rigid polyurethane products can be prepared by rapidly mixing the components of the compositions of the present invention. It is preferred to thoroughly blend together the components represented by (A), (B) and (C) and then mixing the resultant mixture with component (D), the catalyst. Mechanical dispensing or combination mixingdispensing devices can be employed by utilizing 2 or more streams of the individual components or mixtures of the components which are introduced into said device.

Other components including inert fillers such as, for example, sand, microballoons, glass fibers, asbestos, aluminum granules, silicon carbide powder and the like, coloring agents, such as pigments and dyes including, for example, chromic oxide, ferric oxide, mixtures thereof and the like may be employed in the compositions of the present invention without detracting from the scope thereof.

The compositions of the present invention rapidly produce solid products which may be demolded, i.e. the articles produced therefrom may be removed from the mold, within about 5 minutes, usually within about 3 minutes and preferably within about 1 minute or less from the time the catalyst is blended into the mixture and do not require the application of external sources of heat to accomplish this, although in some circumstances it may be desirable to post cure, at elevated temperatures, the products in order to develop certain properties. The compositions of the present invention not only can be demolded within 5 minutes and often in less than 2 to 3 minutes, but the cast objects produced therefrom have developed sufficient strength properties to be employed for their intended purpose after the objects have been cooled to room temperature. The cast objects are hot or warm to the touch immediately after removing from the mold due to the exotherm generated during the reaction. This is a valuable contribution to the urethane molding art, in that productivity can be increased employing a given quantity of molds.

Suitable materials from which adequate molds, for casting the compositions of the present invention, may be prepared include polymers such as, for example, polyethylene, polypropylene, their copolymers and the like, polyurethanes, polysiloxane elastomers, Mylar, cured polyepoxides, mixtures thereof and the like.

It is preferred to employ relatively thin wall molds or molds having a low heat capacity or thermal conductivity. Heavy molds made of relatively high thermal conductivity materials such as aluminum, copper, iron or steel and the like may present curing problems, i.e. the reactants may not be readily demolded unless the mold is preheated to about 50–90°C, especially when casting relativey thin sections. However, high thermal conductivity materials such as copper or aluminum can be employed as thin wall molds without preheating if the thermal capacity of the mold is relatively low compared to the amount of heat liberated in the casting.

The compositions of the present invention are useful as, but not restricted to such uses as, a casting material for preparing bearing surfaces, annular spacers, decorative objects, furniture or furniture components, gears or other machine components, threaded protective plugs and caps, and the like.

The following examples are illustrative of the present invention but are not to be construed as limiting the scope thereof in any manner.

EXAMPLES 1 to 6 AND COMPARATIVE EXPERIMENTS A TO G

In each of these examples and comparative experiments, a formulation consisting of
33 wt. % of an adduct of glycerine and propylene oxide to an equivalent weight of about 87;
33 wt. % of an 80/20 mixture of 2,4-2,6-toluene diisocyanate;
33 wt. % of the indicated modifier; 1 wt. % of stannous octoate was prepared by blending all of the components together except the catalyst and then rapidly adding and blending catalyst and rapidly pouring into a Mylar tray.

The modifier employed and the physical properties of the resultant products are given in Table I. In the table, the experiments designated by a mumeral are examples of the present invention whereas those designated by a letter are comparative experiments.

Table I

| Experiment No. | Modifier Compound | Barcol Hardness[1] | Flexural Strength[2] psi |
|---|---|---|---|
| 1 | 2,4-dimethyl-6-octyl phenol | 44 | 11,316 |
| 2 | tris(α-methyl benzyl)phenol | 52 | 12,258 |
| 3 | tertiarybutyl cresol | 32 | 8,823 |
| 4 | methyl tetrahydrophthalic anhydride | 45 | 14,838 |

Table I—Continued

| Experiment No. | Modifier Compound | Barcol Hardness[1] | Flexural Strength[2] psi |
|---|---|---|---|
| 5 | dodecenyl succinic anhydride | 42 | 9,3c |
| 6 | Nadic methyl anhydride | 54 | 10,253 |
| A | dioctyl phthalate | <1 | 6,075 |
| B | trichlorobenzene | <1 | 3,855 |
| C | tris(2-chloroethyl)phosphate | <1 | 1,404 |
| D | Sulfolane A | <1 | 282 |
| E | polyethyl benzenes | <1 | N.D. |
| F | tall oil | <1 | N.D. |
| G | cumene | <1 | N.D. |

[1]Barcol Hardness Determined on Tester No. 934-1.
[2]Flexural Strength determined as that stress required to effect a deflection of 0.1 inch over a 2-inch span, at a beam thickness of ⅛ inch.

EXAMPLES 7 to 14 AND COMPARATIVE EXPERIMENTS H TO M

In each of the following Examples and Comparative Experiments all of the components except the catalyst were blended together and then the catalyst was rapidly admixed therewith and the resultant mixture poured into a polyethylene beaker or a Mylar tray. The composition and properties of the resultant products are given in the following Table II.

TABLE II

| COMPONENT AND PROPERTY | COMPARATIVE EXPERIMENT L | EX. 9 | COMPARATIVE EXPERIMENT M | EX. 10 | EX. 11 | EX. 12 | EX. 13 | EX. 14 | EX. 15 | EX. 16 |
|---|---|---|---|---|---|---|---|---|---|---|
| Polyol, Type/grams | A/40 | A/30 | A/30 | A/40 | A/20 | A/40 | B/26 | A/30 | A/30 | A/30 |
| Polyisocyanate, type/gm | A/40 | A/30 | A/30 | A/40 | A/20 | A/40 | B/45 | A/30 | A/30 | A/30 |
| Modifier, type/grams | H/40 | I/30 | none | J/40 | K[6]/10 | L/40 | J/30 | J/30 | M/30 | N/30 |
| Catalyst, type/cc | A/0.8 | B/1 | B/1 | B/1 | B/0.4 | B/1 | B/1 | A/1 | B/1 | B/1 |
| Mold type | MT | MT | MT | MT | PE | MT | PE | PE | PE | PE |
| Solidification time, seconds | 15 | 30 | 10 | 20 | 30 | 20 | 25 | 50 | 20 | 20 |
| Demold time, seconds | 120 | 120 | N.D.[1] | 120 | 60 | 120 | 50 | 180 | 45 | 45 |
| Barcol Hardness | N.D. | 45[2] | N.D. | 54[2] | 40[2] | 42[2] | 30[2] | 30[2] | 35[2] | 20[2] |
| Tensile strength in psi/at % elongation | N.D. | 8553/8 | N.D. | 13382/6 | N.D. | 9285/8 | N.D. | N.D. | N.D. | N.D. |
| Density, g/cc | N.D. | >1 | 0.38 | >1 | >1 | >1 | >1 | >1 | >1 | >1 |
| Remarks | N.D. product was weak, soft, sticky, flexible - mass unsuitable for commercial application. | | swelled, distorted and cracked 2-4 min. after solidification | | | | | | | |

[1]N.D. = not determined
[2]Barcol Hardness determined on a 934-1 type tester.
[3]Barcol Hardness determined on a 935 type tester.
[4]PE = polyethylene beaker
[5]MT = Mylar tray
[6]The solid modifier compound was dissolved in the polyol and then the other components were added and blended.

POLYOL A was the adduct of glycerine and propylene oxide to an average hydroxyl equivalent weight of about 87.
POLYOL B was the adduct of glycerine and ethylene oxide having a % OH of about 22 and an OH equivalent weight of about 77.
POLYISOCYANATE A was an 80/20 mixture of 2,4-/2,6-toluene diisocyanate.
POLYISOCYANATE B was a modified diphenylmethane diisocyanate having a functionality of about 2.3 and an NCO equivalent weight of about 130, commercially available from the Upjohn Co. as Isonate 390P.
CATALYST A was lead octoate.
CATALYST B was stannous octoate.
MODIFIER A was tris(α-methylbenzyl)phenol.
MODIFIER B was dioctyl phthalate.

MODIFIER C was propylene carbonate.
MODIFIER D was cumyl phenol.
MODIFIER E was 2,4-dimethyl-6-octyl phenol.
MODIFIER F was 2,6-ditertiary butyl-4-methyl phenol.
MODIFIER G was tris(2-chloroethyl)phosphate.
MODIFIER H was metal cresol.
MODIFIER I was tetrahydrophthalic anhydride.
MODIFIER J was Nadic methyl anhydride, a mixture of the isomers of methylbicyclo (2.2.1) heptene-2,3-dicarboxylic anhydride.
MODIFIER K was 2,2'thiobis(4-methyl-6-tertiarybutyl)phenol.
MODIFIER L was dodecenyl succinic anhydride.
MODIFIER M was a liquid mixture of
37.2 wt. % of 2,6-diphenyl phenol
34.9 wt. % of 2,4-diphenyl phenol
17.2 wt. % of p-diphenyl phenyl ether
9.4 wt. % of o-diphenyl phenyl ether
MODIFIER N was a 50/50 wt. % mixture of tris(alphamethylbenzyl)phenol and dodecenyl succinic anhydride.

I claim:
1. A solid, rigid, non-cellular urethane polymer having a density of at least about 1 gram/cc resulting from admixture of the components of a composition comprising
   A. an active hydrogen-containing component selected from
      1. a polyether polyol having a hydroxyl equivalent weight of between about 75 and about 230 and containing from 3 to about 8 hydroxyl groups per molecule,
      2. a dihydroxyl-containing compound having a hydroxyl equivalent weight of less than about 250, and
      3. mixtures thereof;
   B. an organic polyisocyanate;
   C. a modifier component comprising
      1. 50–100% by weight of, as a modifier, a cyclic anhydride of a dicarboxylic acid said anhydride being selected from the group consisting of dodecenyl succinic anhydride, tetrahydrophthalic anhydride and methylbicyclo (2.2.1) heptene 2,3-dicarboxylic anhydride, and mixtures thereof;
      2. 0–50% by weight of a co-modifier selected from
         a. organic liquid compounds having a boiling point above about 150°C,
         b. liquid halogenated aliphatic compounds containing a hydroxyl group and having a boiling point of less than about 150°C, or
         c. mixtures thereof;
   D. a non-amine catalyst for urethane formation;
wherein components (A) and (B) are present in quantities such that the NCO:OH ratio is from about 0.8:1 to about 1.5:1; the quantities of component (C) being from about 10 to about 50 percent by weight based upon the combined weight of components (A), (B) and (C); with the provision that when component (A-2) is employed as the sole component of (A) then component (B) has a functionality of at least about 2.5; and when component (A-1) is an amine initiated polyol and is employed as the sole component of component (A), then component (D) need not be present; and wherein said polymer can be demolded within less than about 5 minutes, without the application of an external source of heat, after admixture of the components of said composition.

2. The composition of claim 1 wherein components (A) and (B) are present in quantities such that the NCO:OH ratio is from about 0.90:1 to about 1.2:1 and component (C) is present in quantities of from about 20 to about 40 percent by weight based upon the combined weight of components (A), (B) and (C).

3. The composition of claim 2 wherein component (C) consists of 100% of component (C-1).

4. Articles cast from the compositions of claim 1.

5. The articles of claim 4 wherein said articles are furniture components.

6. The articles of claim 4 wherein said articles are decorative objects.

7. The articles of claim 4, wherein said articles are machine components.

8. A solid, rigid, non-cellular urethane polymer having a density of at least about 1 gram/cc resulting from admixture of the components of a composition comprising
   A. an active hydrogen-containing component selected from
      1. a polyether polyol having a hydroxyl equivalent weight of between about 75 and about 230 and containing from 3 to about 8 hydroxyl groups per molecule,
      2. a dihydroxyl-containing compound having a hydroxyl equivalent weight of less than about 250, and
      3. mixtures thereof;
   B. an organic polyisocyanate;
   C. a modifier component comprising
      1. 50–100% by weight of a modifier mixture containing at least one member of each group selected from
         a. a substituted aromatic compound containing at least one aromatic hydroxyl group and at least one substituent which contains at least 3 carbon atoms attached to each ring containing an aromatic hydroxyl group; and
         b. a cyclic anhydride of a dicarboxylic acid said anhydride selected from the group consisting of dodecenyl succinic anhydride, tetrahydrophthalic anhydride and methylbicyclo (2.2.1) heptene, 2,3-dicarboxylic anhydride; and
      2. 2. 0–50% by weight of a co-modifier selected from
         a. organic liquid compounds having a boiling point above about 150°C,
         b. liquid halogenated aliphatic compounds containing a hydroxyl group and having a boiling point of less than about 150°C, or
         c. mixtures thereof;
   D. a non-amine catalyst for urethane formation;
wherein components (A) and (B) are present in quantities such that the NCO:OH ratio is from about 0.8:1 to about 1.5:1; the quantities of component (C) being from about 10 to about 50 percent by weight based upon the combined weight of components (A), (B) and (C); with the provision that when component (A-2) is employed as the sole component of (A) then component (B) has a functionality of at least about 2.5; and when component (A-1) is an amine initiated polyol and is employed as the sole component of component (A), then component (D) need not be present; and wherein said polymer can be demolded within less than about 5 minutes, without the application of an external source of heat, after admixture of the components of said composition.

9. The composition of claim 8 wherein components (A) and (B) are present in quantities such that the NCO:OH ratio is from about 0.90:1 to about 1.2:1 and component (C) is present in quantities of from about 20 to about 40 percent by weight based upon the combined weight of components (A), (B) and (C).

10. The composition of claim 9 wherein component (C1a) is selected from the group consisting of tris($\alpha$-methylbenzyl) phenol, cumyl phenol, 2,4-dimethyl-6-octyl phenol, 2,6-ditertiarybutyl-4-methyl phenol and 2,2'-thiobis(4-methyl6-tertiarybutyl)phenol.

11. Articles cast from the composition of claim 8.

12. The articles of claim 11 wherein said articles are furniture components.

13. The articles of claim 11 wherein said articles are decorative objects.

14. The articles of claim 11 wherein said articles are machine components.

* * * * *

UNITED STATES PATENT OFFICE
CERTIFICATE OF CORRECTION

Patent No. 3,914,198　　　　　　　　　　Dated Oct. 21, 1975

Inventor(s) Franciszek Olstowski

It is certified that error appears in the above-identified patent and that said Letters Patent are hereby corrected as shown below:

Col. 9, line 60, change "propnaol" to --propanol--.

Col. 12, line 16, change "EXAMPLES 7 to 14" to --EXAMPLES 7 to 18--.

In Table II, Cols. 11 and 12, change "EX. 9" to --EX. 11--; "EX. 10" to --EX. 12--; "EX. 11" to --EX. 13--; "EX. 12" to --EX. 14--; "EX. 13" to --EX. 15--; "EX. 14" to --EX. 16--; "EX. 15" to --EX. 17-- and "EX. 16" to --EX. 18--.

Add the following to Table II at Col. 11 and 12.

| COMPONENT AND PROPERTY | COMPARATIVE EXPERIMENT H | EXAMPLE 7 | EXAMPLE 8 | COMPARATIVE EXPERIMENT J | EXAMPLE 9 | EXAMPLE 10 | COMPARATIVE EXPERIMENT K |
|---|---|---|---|---|---|---|---|
| Polyol, Type/grams | A/30 | A/30 | A/40 | A/40 | A/40 | A/50 | A/50 |
| Polyisocyanate, Type/gm | A/30 | A/30 | A/40 | A/40 | A/40 | A/50 | A/50 |
| Modifier, type/gm | none | A/30 | C/20 D/20 | C/40 | E/40 | F/25 C/25 | C/50 |
| Catalyst, type/cc | A/1 | A/1 | B/1 | B/1 | A/0.8 | B/1 | B/1 |
| Mold type | PE* | PE | MT | MT | MT | MT | MT |
| Solidification time, seconds | 10 | 20 | ≈30 | <30 | 15 | 15 | 15 |
| Demold time, seconds | N.D.¹ | 60 | 60 | 60 | 120 | 60 | 60 |
| Barcol Hardness | N.D. | 50° | 90° | <1° | 44° | 22° | <1° |
| Tensile strength in psi/at % elongation | N.D. | 10182/8 | N.D. | F.D. | 8171/7 | N.D. | N.D. |
| Density, g/cc | .38 | >1 | >1 | >1 | >1 | >1 | >1 |
| Remarks | swelled, distorted, cracked 2-4 min. after solidification | | | | | | |

Signed and Sealed this sixth Day of April 1976

[SEAL]

Attest:

RUTH C. MASON　　　　　　　　　　C. MARSHALL DANN
Attesting Officer　　　　　　　　　Commissioner of Patents and Trademarks